(12) United States Patent
Huang et al.

(10) Patent No.: US 11,085,898 B2
(45) Date of Patent: Aug. 10, 2021

(54) ADJUSTING MECHANISM OF EDDY CURRENT SENSOR

(71) Applicant: HANGZHOU SHENHAO TECHNOLOGY CO., LTD., Hangzhou (CN)

(72) Inventors: Ming Huang, Hangzhou (CN); Zhiming Li, Hangzhou (CN); Rong He, Hangzhou (CN); Xiongshan Kong, Hangzhou (CN); Fuliang Luo, Hangzhou (CN)

(73) Assignee: HANGZHOU SHENHAO TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/931,413

(22) PCT Filed: Dec. 10, 2019

(86) PCT No.: PCT/CN2019/124320
§ 371 (c)(1),
(2) Date: Jul. 16, 2020

(87) PCT Pub. No.: WO2021/012582
PCT Pub. Date: Jan. 28, 2021

(65) Prior Publication Data
US 2021/0088475 A1 Mar. 25, 2021

(51) Int. Cl.
*G01N 27/90* (2021.01)

(52) U.S. Cl.
CPC ..... *G01N 27/9046* (2013.01); *G01N 27/9006* (2013.01)

(58) Field of Classification Search
CPC ............ G01N 27/025; G01N 27/9053; G01N 27/9073; G01N 17/008; G01R 33/032;
(Continued)

(56) References Cited

U.S. PATENT DOCUMENTS 9,316,617 B2 4/2016 Graebner
2007/0261522 A1* 11/2007 Bono ....................... B23Q 3/18
82/158
(Continued)

FOREIGN PATENT DOCUMENTS

CN 101975819 B 12/2011
CN 203465237 U 3/2014
(Continued)

*Primary Examiner* — Alvaro E Fortich
*Assistant Examiner* — Zannatul Ferdous

(57) ABSTRACT

An adjustment structure for an electric eddy current sensor is provided in the present invention, which includes an electric eddy current fixing base, an electric eddy current base plate, a spring buffer mechanism, a rotation adjustment mechanism and an electric eddy current mechanism. The rotation adjustment mechanism is disposed on the electric eddy current fixing base, the electric eddy current mechanism is disposed on the rotation adjustment mechanism, the electric eddy current base plate is disposed on a bottom of the electric eddy current fixing base, and the spring buffer mechanism is disposed on a bottom of the electric eddy current base plate. With provision of the rotation adjustment structure, the control system on the inspection robot drives the adjustment motor to start working, thereby driving the reducer to start working. The output torque of the active adjustment shaft is increased through the action of the reducer.

9 Claims, 6 Drawing Sheets

(58) Field of Classification Search
CPC .. G01R 33/323; G01H 1/003; G05B 23/0245; G01K 1/20; F16H 25/20; B60R 21/0136
See application file for complete search history.

(56) References Cited

U.S. PATENT DOCUMENTS

2012/0296463 A1* 11/2012 Rivers .................. B23Q 9/0042
700/114
2015/0094836 A1* 4/2015 Rivers .................... B23B 25/06
700/97

FOREIGN PATENT DOCUMENTS

| | | |
|---|---|---|
| CN | 205982175 U | 2/2017 |
| CN | 206114588 U | 4/2017 |
| CN | 208013143 U | 10/2018 |
| CN | 110375630 A | 10/2019 |
| JP | H10318988 A | 12/1998 |

\* cited by examiner

ADJUSTING MECHANISM OF EDDY CURRENT SENSOR

BACKGROUND OF THE INVENTION

Field of the Invention

The present disclosure relates to the field of inspection robot, in particular, to an adjustment structure for an electric eddy current sensor.

Description of Related Art

In the power sector, especially on high-voltage, ultra-high-voltage transmission and distribution lines and in sub-stations, partial discharge detector (referred to as PD) is a phenomenon that may cause serious accidents and economic losses, so both the power production and power transmission units have to detect the partial discharge detector phenomenon in a timely manner through various means. For example, GIS (Gas Insulated Switchgear), one of the most important equipment in the current power system, is a power device that integrates high-voltage circuit breakers, disconnectors, current transformers, voltage transformers, lightning arresters and other equipment into a metal enclosed cavity, with an interior filled with sulfur hexafluoride (SF6) as an insulating medium and arc-extinguishing gas. The pros and cons of the state of GIS are related to the safe and stable operation of the entire power system. However, defects in insulation will be unavoidable in manufacturing, transportation, field assembly, and actual operation, so that partial discharge detector will occur during operation, which at the same time will further deteriorate the insulation state until the insulation is completely broken down. Therefore, by monitoring the partial discharge detector inside the GIS, the insulation status of the GIS can be evaluated to find the internal defects in insulation in advance and avoid accidents. The localization of the source of partial discharge detector is an important purpose for monitoring partial discharge detector. It is of great significance for the condition monitoring of power equipment and can guide the reasonable arrangement of maintenance and save a lot of manpower and material resources.

At present, commonly used partial-discharge ultrasonic inspection instruments use similar parabolic or horn antennas in antennas to amplify the received ultrasonic signals for further detection of the partial-discharge, but workers have to manually scan the lines while holding such inspection equipment. This type of ultrasonic inspection equipment places the acoustic sensor at energy gathering places of the antenna, which can increase the gain and increase the range of the product as compared with a single sensor. However, for the above equipment, the beam angle is narrow, and the servo mechanism is required to perform an airspace scan to find the location of the discharge or manpower is needed to find the location of the discharge. The use of servos for airspace scanning is slow.

Therefore, the prior art has a technical problem that the efficiency for the PD detection is not high.

SUMMARY OF THE INVENTION

An object of the present invention is to provide an adjustment structure for an electric eddy current sensor in response to the defects of the prior art.

In order to solve the technical problem, the present invention adopts the following technical solution.

An adjustment structure for an electric eddy current sensor includes an electric eddy current fixing base, an electric eddy current base plate, a spring buffer mechanism, a rotation adjustment mechanism and an electric eddy current mechanism, wherein the rotation adjustment mechanism is disposed on the electric eddy current fixing base, the electric eddy current mechanism is disposed on the rotation adjustment mechanism, the electric eddy current base plate is disposed on a bottom of the electric eddy current fixing base, and the spring buffer mechanism is disposed on a bottom of the electric eddy current base plate.

Further, the rotation adjustment mechanism includes an adjustment motor, a reducer, an active adjustment shaft, a driven adjustment shaft, an active adjustment gear, a driven adjustment gear, and an electric eddy current turntable, wherein the reducer is fixedly mounted in an inner middle of the electric eddy current fixing seat, an input terminal of the reducer is connected with the adjustment motor, and an output terminal of the reducer is connected with the active adjustment shaft; the active adjustment gear is disposed on an end of the active adjustment shaft, and the active adjustment gear is engagedly connected with the driven adjustment gear; the driven adjustment gear is sleeved in the middle of the driven adjustment shaft, a left end of the driven adjustment shaft is pivotally connected to an upper portion of the electric eddy current fixing base, and the electric eddy current turntable is disposed on a right end of the driven adjustment shaft.

Further, the electric eddy current mechanism includes an electric eddy current mounting bracket and an electric eddy current sensor assembly, wherein the electric eddy current mounting bracket includes a first electric eddy current mounting bracket and a second electric eddy current mounting bracket, the first electric eddy current mounting bracket having the same structure as the second electric eddy current mounting bracket; the electric eddy current sensor assembly includes a first electric eddy current sensor assembly, a second electric eddy current sensor assembly, a third electric eddy current sensor assembly and a fourth electric eddy current sensor assembly, the first electric eddy current sensor assembly, the second electric eddy current sensor assembly, the third electric eddy current sensor assembly and the fourth electric eddy current sensor assembly having the same structure; the first electric eddy current mounting bracket is fixedly mounted on a left middle of the electric eddy current turntable, an upper portion of the first electric eddy current mounting bracket is connected with the first electric eddy current sensor assembly, and a lower portion of the first electric eddy current mounting bracket is connected with the second electric eddy current sensor assembly; the second electric eddy current mounting bracket is fixedly mounted on the right middle of the electric eddy current turntable, an upper portion of the second electric eddy current mounting bracket is connected with the third electric eddy current sensor assembly, and a lower portion of the second electric eddy current mounting bracket is connected with the fourth electric eddy current sensor assembly.

Further, the electric eddy current sensor assembly includes a first electric eddy current cylinder housing, a second electric eddy current cylinder housing, an electric eddy current fixed shaft, an upper electric eddy current sensor and a lower electric eddy current sensor, wherein the first electric eddy current cylinder housing matches the second electric eddy current cylinder housing, and the first electric eddy current cylinder housing matches the second electric eddy current cylinder housing to form an electric eddy current cylinder; the electric eddy current cylinder is a hollow structure, and the middle of the electric eddy current cylinder is penetrated with the electric eddy current fixed shaft; the upper electric eddy current sensor is disposed on an upper part of the electric eddy current fixed shaft, and the lower electric eddy current sensor is disposed on the lower part of the electric eddy current fixed shaft.

Further, the electric eddy current cylinder is inside provided with an upper fixed panel and a lower fixed panel, wherein the upper fixed panel includes a first upper fixed panel and a second upper fixed panel, and the lower fixed panel includes a first lower fixed panel and a second lower fixed panel; a first upper fixed pin hole is disposed on the first upper fixed panel, and a second upper fixed pin hole is disposed on the second upper fixed panel; first fixed pins are disposed in the first upper fixed pin hole and the second upper fixed pin hole; a first lower fixed pin hole is disposed on the first lower fixed panel, and a second lower fixed pin hole is disposed on the second lower fixed panel; second fixed pins are disposed in the first lower fixed pin hole and the second lower fixed pin hole.

Further, a camera device is disposed in a middle of the electric eddy turntable, and the camera device is fixed at a right end of the driven adjustment shaft.

Further, an electric eddy current position sensing photoelectric switch is disposed on a lower right end of the electric eddy current fixing base, and an electric eddy current position sensing block matching with the electric eddy current position sensing photoelectric switch is disposed on a rear end of the electric eddy current turntable.

Further, the spring buffer mechanism includes a slider assembly, an electric eddy current buffer spring, an electric eddy current spring guide post, an electric eddy current guide rod seat and an electric eddy current spring seat, wherein the slider assembly has two sets, the two sets of slider assembly are arranged horizontally, and the electric eddy current spring guide post is disposed between the two sets of slider assembly; the electric eddy current guide rod seat and the electric eddy current spring seat are mounted on the electric eddy current spring guide post, and the electric eddy current spring seat is seated on a left side of the electric eddy current spring guide post; the electric eddy current guide rod seat is seated on a right side of the electric eddy current spring guide post, and the electric eddy current spring guide post is sleeved outside with the electric eddy current buffer spring; a left portion of the electric eddy current buffer spring is connected to the electric eddy current spring seat, a right portion of the electric eddy current buffer spring is connected to electric eddy current guide rod seat, and a right end of the electric eddy current spring guide post is connected to a bottom middle of the electric eddy current fixing base.

Further, the slider assembly includes a slide rail and a slider, wherein a slide groove is disposed on the slide rail, a slider is disposed in the slide groove, and the slider is connected to the electric eddy current base plate.

Further, a spring buffer sensing photoelectric switch is disposed on the electric eddy current spring seat, and a spring buffer sensing block matching with the spring buffer sensing photoelectric switch is disposed on the slider assembly.

As a result of adopting the above technical solution, the present invention has the following beneficial effects.

The present invention is an adjustment structure for an electric eddy current sensor, which is simple, scientific and convenient, highly targeted, convenient to use, low in cost, simple to operate, and easy to popularize.

With provision of the rotation adjustment structure, the control system (not shown) on the inspection robot drives the adjustment motor to start working, thereby driving the reducer to start working, and the reducer may be a gear reducer, a worm reducer or a planetary reducer, so that the output torque of the active adjustment shaft is increased through the action of the reducer. Then, with the engaging action between the active adjustment gear and the driven adjustment gear, the driven adjustment gear drives the active adjustment shaft to rotate, thereby driving the electric eddy current turntable to rotate. In this way, the first electric eddy current sensor assembly, the second electric eddy current sensor assembly, the third electric eddy current sensor assembly and the fourth electric eddy current sensor assembly on the electric eddy current mechanism may be adjusted for rotation adjustment, so that the four electric eddy current sensor assemblies are adjusted to the appropriate positions, which is convenient for the inspection robot to perform detection for electric eddy current on the electrical assemblies in the power station and complete the related detection work.

Specifically, four electric eddy current sensor assemblies are designed on the electric eddy current mechanism such that the electric eddy current sensor assembly may measure the distance of a tested metal conductor from a probe surface statically and dynamically without contact, with high linearity, and with high resolution. It is a non-contact linear metrology tool. The electric eddy current sensor assembly may accurately measure the static and dynamic relative changes in displacement between the tested object (must be a metal conductor) and the probe end surface. By designing four electric eddy current sensor assemblies and the electric eddy current sensor assemblies into a cylindrical shape, the electric eddy current cylinder of the eddy current sensor assembly contacts the electrical components, so that the electric eddy current cylinder of the electric eddy current sensor assembly may smoothly contact the electrical components, and the detection accuracy is improved with simultaneous detection by four electric eddy current sensor assemblies.

Specifically, the four electric eddy current sensor assemblies form a detection matrix, and the electric eddy current cylinder of the electric eddy current sensor assembly may rotate around its central axis and may move horizontally or vertically to detect horizontal or vertical cracks through the action of rotation adjustment for the mechanism by the spring buffer mechanism with the cooperation of the inspection robot, wherein when two eddy current sensors are located on a crack, the same change in signal will be generated, and then if the change in signal of the two eddy current sensors are the same, it is determined that a crack is detected.

Specifically, the eddy current sensor is mounted in the electric eddy current cylinder, and the electric eddy current cylinder rolls on the surface of the distribution cabinet to generate a capacitance by induction when a gap is detected by the eddy current sensor; then, a voltage signal is converted according to the capacitance for sending to a FPGA processor in the body of the robot, wherein generally, the normal voltage is a few tenths of a volt, but appearing more than a few volts indicates there is a gap, which indicates that there is a gap caused by the partial discharge detector on the distribution cabinet, so then the staff may perform targeted repairs. This method of using a robot for detection instead of manual detection is convenient for detection.

BRIEF DESCRIPTION OF THE DRAWINGS

Aspects of the present invention are best understood from the following detailed description when read with the accompanying figures. The exemplary embodiments of the present invention and the description thereof are used to explain the present invention, and do not constitute improper limitations on the preset invention. In the drawings.

DESCRIPTION OF THE PREFERRED EMBODIMENTS

Figure 1:
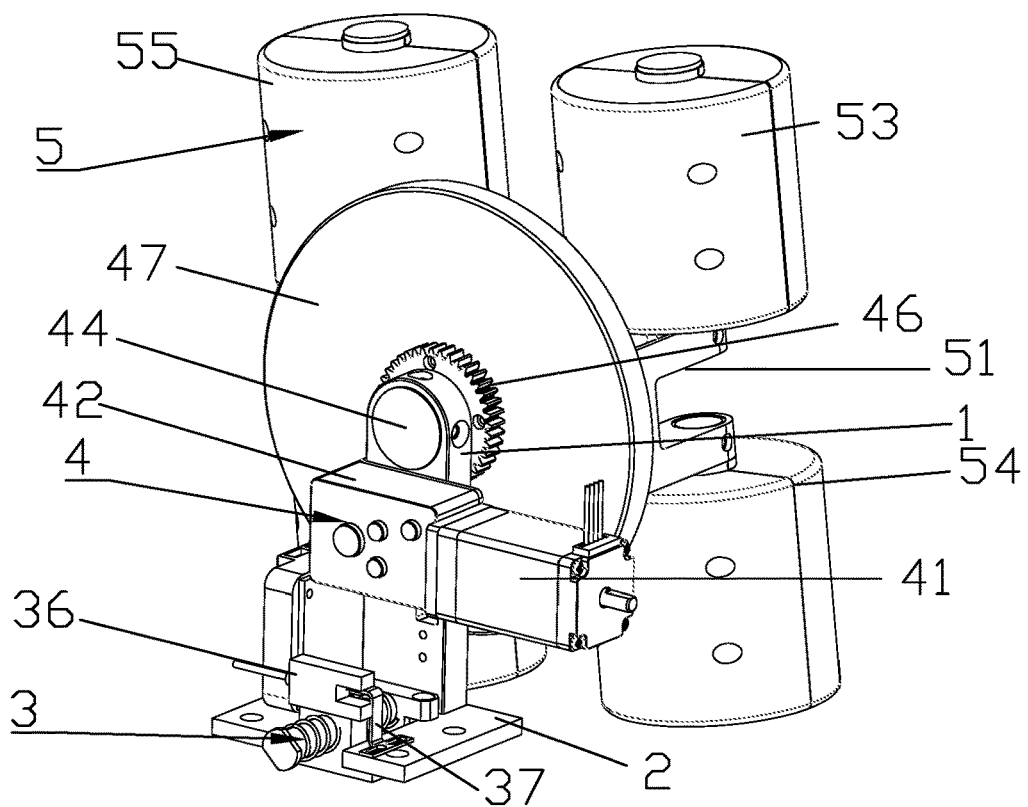
FIG. 1 is a structural diagram of an adjustment structure for an electric eddy current sensor in the present invention.

In order that the objectives, technical solutions and advantages of the present invention will become more apparent, the present invention will be described in more detail with reference to the drawings and examples above. It should be understood that the specific embodiments described herein are only for illustrating but not for limiting the present invention. In addition, in the following description, descriptions of well-known structures and technologies are omitted to avoid unnecessarily obscuring the concept of the present invention.

With reference to FIGS. 1 to 12, an adjustment structure for an electric eddy current sensor includes an electric eddy current fixing base 1, an electric eddy current base plate 2, a spring buffer mechanism 3, a rotation adjustment mechanism 4 and an electric eddy current mechanism 5, wherein the rotation adjustment mechanism 4 is disposed on the electric eddy current fixing base 1, the electric eddy current mechanism 5 is disposed on the rotation adjustment mechanism 4, the electric eddy current base plate 2 is disposed on a bottom of the electric eddy current fixing base 1, and the spring buffer mechanism 3 is disposed on a bottom of the electric eddy current base plate 2.

In the present embodiment, with reference to FIGS. 1, 2, 3, 9, 10 and 12, the rotation adjustment mechanism 4 includes an adjustment motor 41, a reducer 42, an active adjustment shaft 43, a driven adjustment shaft 44, an active adjustment gear 45, a driven adjustment gear 46, and an electric eddy current turntable 47, wherein the reducer 42 is fixedly mounted in the middle of the inside of the electric eddy current fixing seat 1, an input terminal of the reducer 42 is connected with the adjustment motor 41, and an output terminal of the reducer 42 is connected with the active adjustment shaft 43; the active adjustment gear 45 is disposed on an end of the active adjustment shaft 43, and the active adjustment gear 45 is engagedly connected with the driven adjustment gear 46; the driven adjustment gear 46 is sleeved in the middle of the driven adjustment shaft 44, a left end of the driven adjustment shaft 44 is pivotally connected to an upper portion of the electric eddy current fixing base 1, and the electric eddy current turntable 47 is disposed a right end of the driven adjustment shaft 44. When the electric eddy current sensing detection is required to perform, by rotating the rotation adjustment structure 4, the control system (not shown) on the inspection robot drives the adjustment motor 41 to start working, thereby driving the reducer 42 to start working, and the reducer 42 may be a gear reducer, a worm reducer or a planetary reducer, so that the output torque of the active adjustment shaft 43 is increased through the action of the reducer 42. Then, with the engaging action between the active adjustment gear 45 and the driven adjustment gear 46, the driven adjustment gear 46 drives the active adjustment shaft 44 to rotate, thereby driving the electric eddy current turntable 47 to rotate. In this way, the first electric eddy current sensor assembly 53, the second electric eddy current sensor assembly 54, the third electric eddy current sensor assembly 55 and the fourth electric eddy current sensor assembly 56 on the electric eddy current mechanism 5 may be adjusted for rotation adjustment, so that the four electric eddy current sensor assemblies are adjusted to the appropriate positions, which is convenient for the inspection robot to perform detection for electric eddy current on the electrical assemblies in the power station and complete the related detection work.

In the present embodiment, with reference to FIGS. 1, 3, 4, 5, 6 and 7, the electric eddy current mechanism 5 includes an electric eddy current mounting bracket and an electric eddy current sensor assembly, wherein the electric eddy current mounting bracket includes a first electric eddy current mounting bracket 51 and a second electric eddy current mounting bracket 52, the first electric eddy current mounting bracket 51 having the same structure as the second electric eddy current mounting bracket 52, and the electric eddy current sensor assembly includes a first electric eddy current sensor assembly 53, a second electric eddy current sensor assembly 54, a third electric eddy current sensor assembly 55 and a fourth electric eddy current sensor assembly 56, the first electric eddy current sensor assembly 53, the second electric eddy current sensor assembly 54, the third electric eddy current sensor assembly 55 and the fourth electric eddy current sensor assembly 56 having the same structure; the first electric eddy current mounting bracket 51 is fixedly mounted on the left middle of the electric eddy current turntable 47, an upper portion of the first electric eddy current mounting bracket 51 is connected with the first electric eddy current sensor assembly 53, and a lower portion of the first electric eddy current mounting bracket 51 is connected with the second electric eddy current sensor assembly 54; the second electric eddy current mounting bracket 52 is fixedly mounted on the right middle of the electric eddy current turntable 47, an upper portion of the second electric eddy current mounting bracket 52 is connected with the third electric eddy current sensor assembly 55, and a lower portion of the second electric eddy current mounting bracket 52 is connected with the fourth electric eddy current sensor assembly 56.

With reference to FIGS. 1, 3, 4, 5, 6, 7 and 8, the electric eddy current sensor assembly includes a first electric eddy current cylinder housing 531, a second electric eddy current cylinder housing 532, an electric eddy current fixed shaft 533, an upper electric eddy current sensor 534 and a lower electric eddy current sensor 535, wherein the first electric eddy current cylinder housing 531 matches the second electric eddy current cylinder housing 532, and the first electric eddy current cylinder housing 531 matches the second electric eddy current cylinder housing 532 to form an electric eddy current cylinder; the electric eddy current cylinder is a hollow structure, and the middle of the electric eddy current cylinder is penetrated with the electric eddy current fixed shaft 533; the upper electric eddy current sensor 534 is disposed on an upper part of the electric eddy current fixed shaft 533, and the lower electric eddy current sensor 535 the lower part of the electric eddy current fixed shaft 533.

With reference to FIGS. 1, 3, 4, 5, 6, 7 and 8, the electric eddy current cylinder is inside provided with an upper fixed panel 536 and a lower fixed panel 537, wherein the upper fixed panel 536 includes a first upper fixed panel 5361 and a second upper fixed panel 5362, and the lower fixed panel 537 includes a first lower fixed panel 5371 and a second lower fixed panel 5372; a first upper fixed pin hole 5363 is disposed on the first upper fixed panel 5361, and a second upper fixed pin hole 5364 is disposed on the second upper fixed panel 5362; first fixed pins are disposed in the first upper fixed pin hole 5363 and the second upper fixed pin hole 5364 (not shown); a first lower fixed pin hole 5373 is disposed on the first lower fixed panel 5371, and a second lower fixed pin hole 5374 is disposed on the second lower fixed panel 5372; second fixed pins (not shown) are disposed in the first lower fixed pin hole 5373 and the second lower fixed pin hole 5374. With provision of the first upper fixed panel 5361 and the second upper fixed panel 5362, the first upper fixed pin hole 5363 is disposed on the first upper fixed panel 5361, and the second upper fixed pin hole 5364 is disposed on the second upper fixed panel 5362, so that inserting the first fixed pins in the first upper fixed pin hole 5363 and the second upper fixed pin hole 5364 may connect an upper portion of the first electric eddy current cylinder housing 531 together with an upper portion of the second electric eddy current cylinder housing 532. Similarly, with provision of the first lower fixed panel 5371 and the second lower fixed panel 5372, the first lower fixed pin hole 5373 is disposed on the first lower fixed panel 5371, and the second lower fixed pin hole 5374 is disposed on the second lower fixed panel 5372, so that inserting the second fixed pins in the first lower fixed pin hole 5373 and the second lower fixed pin hole 5374 may connect a lower portion of the first electric eddy current cylinder housing 531 together with a lower portion of the second electric eddy current cylinder housing 532. In this way, the first electric eddy current cylinder housing 531 and the second electric eddy current cylinder housing 532 are well fixedly connected together through a connection manner of a pin hole and a pin shaft.

Four electric eddy current sensor assemblies are designed on the electric eddy current mechanism 5 such that the electric eddy current sensor assembly may measure the distance of a tested metal conductor from a probe surface statically and dynamically without contact, with high linearity, and with high resolution. It is a non-contact linear metrology tool. The electric eddy current sensor assembly may accurately measure the static and dynamic relative changes in displacement between the tested object (must be a metal conductor) and the probe end surface. By designing four electric eddy current sensor assemblies and the electric eddy current sensor assemblies into a cylindrical shape, the electric eddy current cylinder of the eddy current sensor assembly contacts the electrical components, so that the electric eddy current cylinder of the electric eddy current sensor assembly may smoothly contact the electrical components, and the detection accuracy is improved with simultaneous detection by four electric eddy current sensor assemblies.

Specifically, the four electric eddy current sensor assemblies form a detection matrix, and the electric eddy current cylinder of the electric eddy current sensor assembly may rotate around its central axis and may move horizontally or vertically to detect horizontal or vertical cracks through the action of the rotation adjustment mechanism 4 and the spring buffer mechanism 3 with the cooperation of the inspection robot, wherein when two eddy current sensors are located on a crack, the same change in signal will be generated, and then if the change in signal of the two eddy current sensors are the same, it is determined that a crack is detected.

Specifically, the eddy current sensor is mounted in the electric eddy current cylinder, and the electric eddy current cylinder rolls on the surface of the distribution cabinet to generate a capacitance by induction when a gap is detected by the eddy current sensor; then, a voltage signal is converted according to the capacitance for sending to a FPGA processor in the body of the robot, wherein generally, the normal voltage is a few tenths of a volt, but appearing more than a few volts indicates there is a gap, which indicates that there is a gap caused by the partial discharge detector on the distribution cabinet, so then the staff may perform targeted repairs. This method of using a robot for detection instead of manual detection is convenient for detection.

Figure 10:
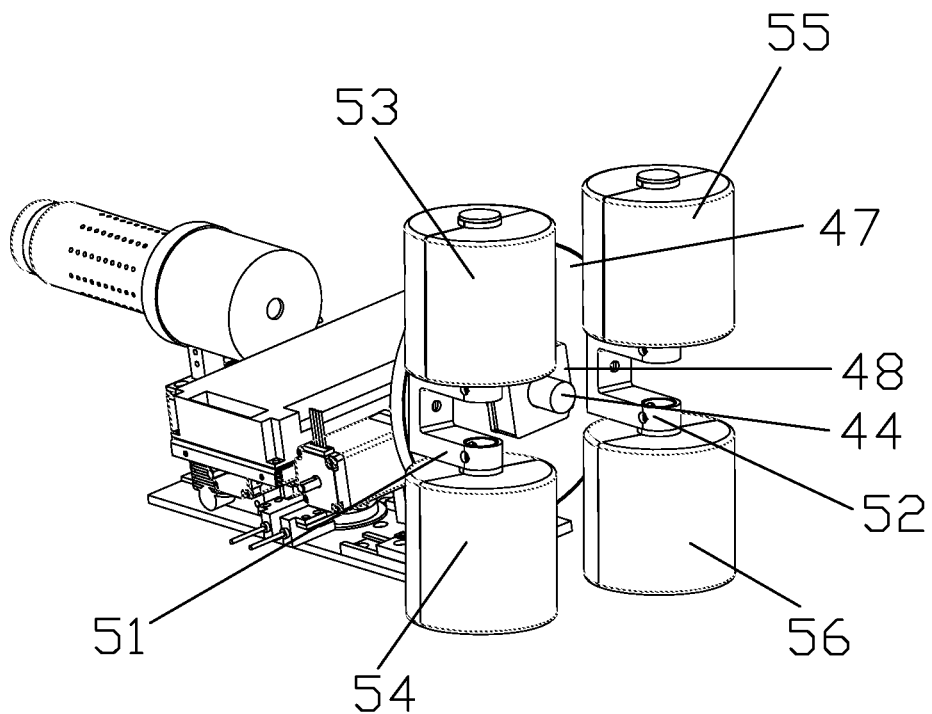
FIG. 10 is a three-dimensional structural diagram of the adjustment structure for the electric eddy current sensor disposed on a base plate of a turntable in the present invention.

In the present embodiment, with reference to FIG. 10, a camera device 48 is disposed on the middle of the electric eddy turntable 47, and the camera device 48 is fixed at a right end of the driven adjustment shaft 44. The camera device 48 is an existing video camera. By designing the camera device 48, the camera device 48 is mounted on the driven adjustment shaft 44, so that the camera lens rotates with the electric eddy current turntable 47, which is convenient for the camera to shoot the corresponding detection process, and convenient for the inspection robot to record the relevant detection information.

Figure 9:
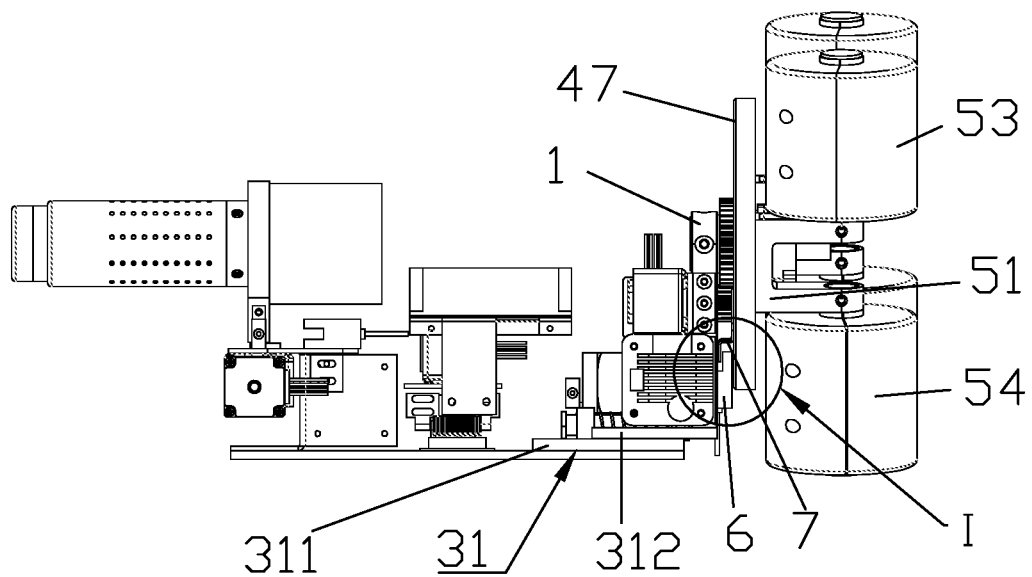
FIG. 9 is a structural diagram of the adjustment structure for the electric eddy current sensor disposed on a base plate of a turntable in the present invention.
Figure 11:
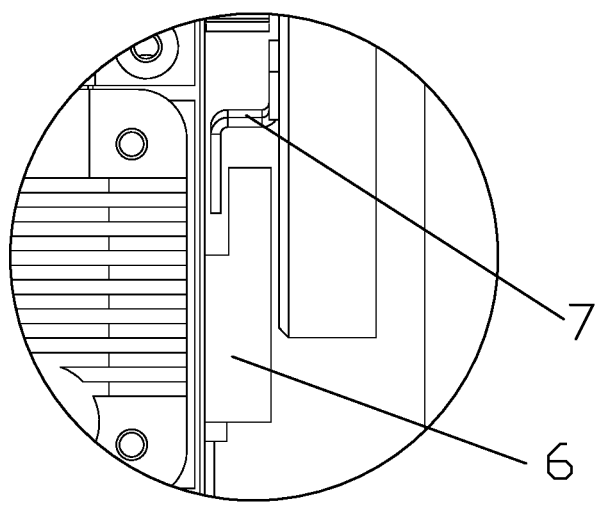
FIG. 11 is an enlarged structural view of the portion I shown in FIG. 9 in the present invention.
Figure 12:
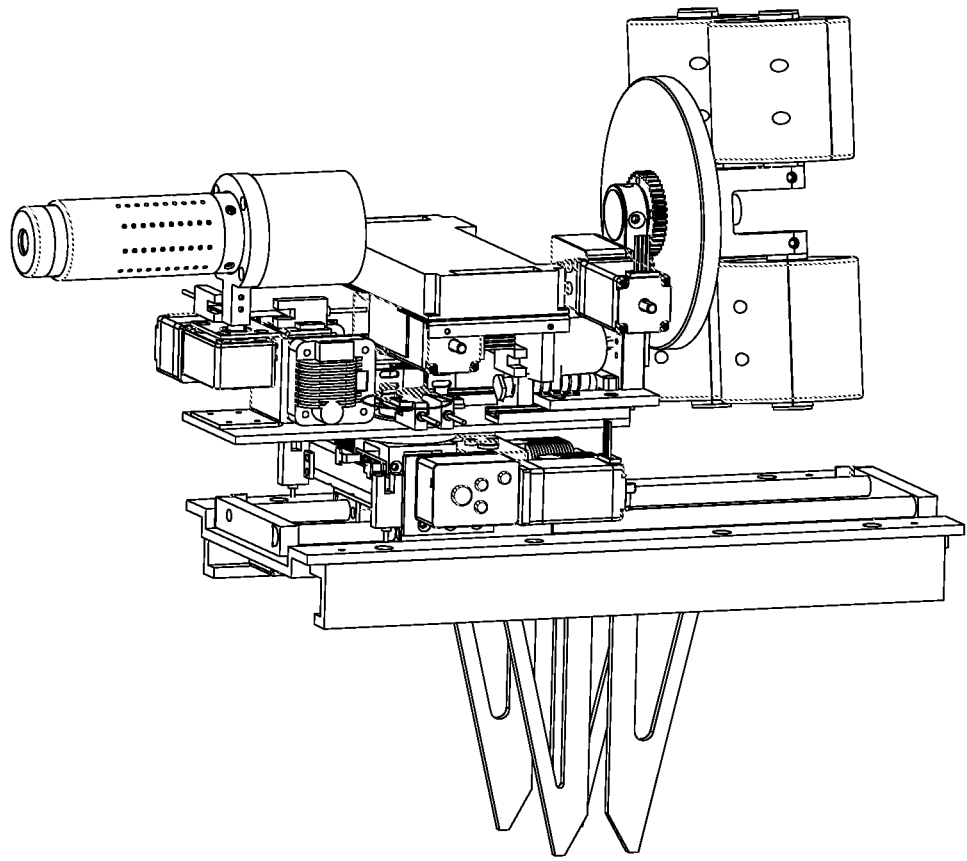
FIG. 12 is a structural diagram of the adjustment structure for the electric eddy current sensor disposed on a detection adjustment structure of a partial discharge detector in the present invention.

In the present embodiment, with reference to FIGS. 9 and 11, an electric eddy current position sensing photoelectric switch 6 is disposed on a lower right end of the electric eddy current fixing base 1, and an electric eddy current position sensing block matching with the electric eddy current position sensing photoelectric switch 6 is disposed on a rear end of the electric eddy current turntable 47. With provision of the electric eddy current position sensing photoelectric switch 6, the rotation adjustment of the electric eddy current turntable 47 does not exceed a predetermined range, so as to ensure that the four electric eddy current sensors may be attached to the cabinet door, thereby improving the adjustment accuracy of the rotation adjustment mechanism 4.

Figure 2:
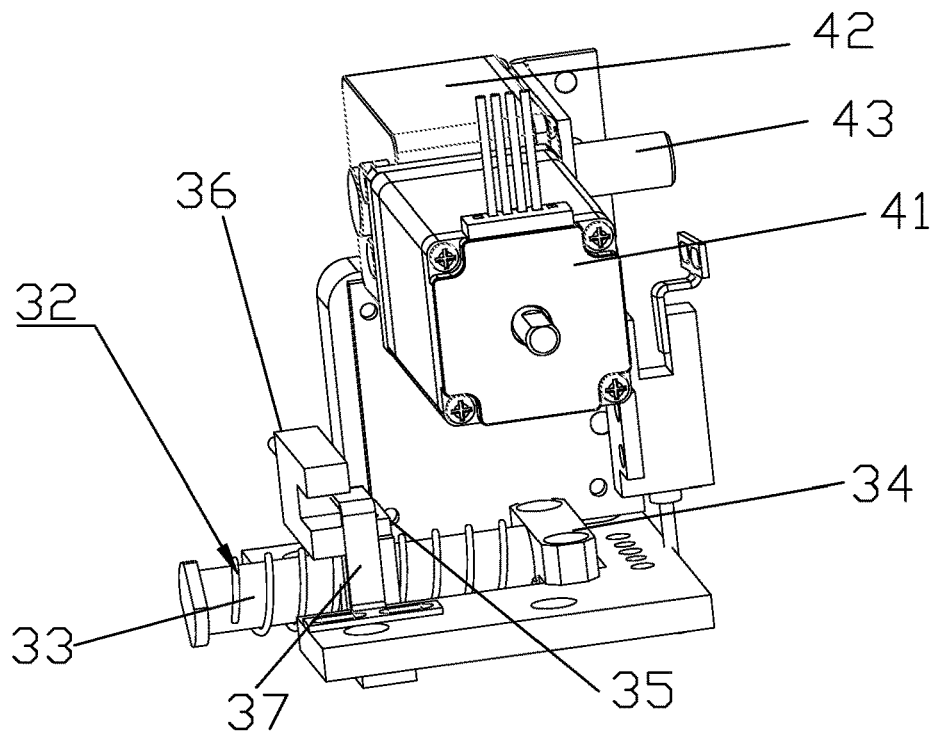
FIG. 2 is a structural diagram of a spring buffer mechanism in the present invention.
Figure 3:
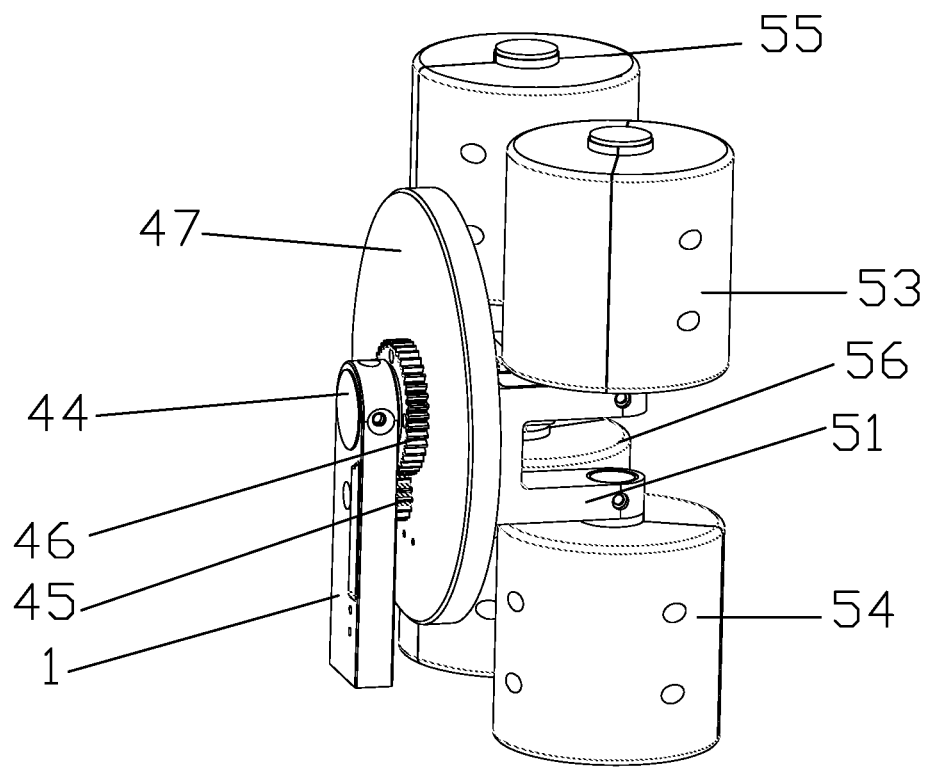
FIG. 3 is a structural diagram of a rotation adjustment mechanism and an electric eddy current mechanism in the present invention.
Figure 4:
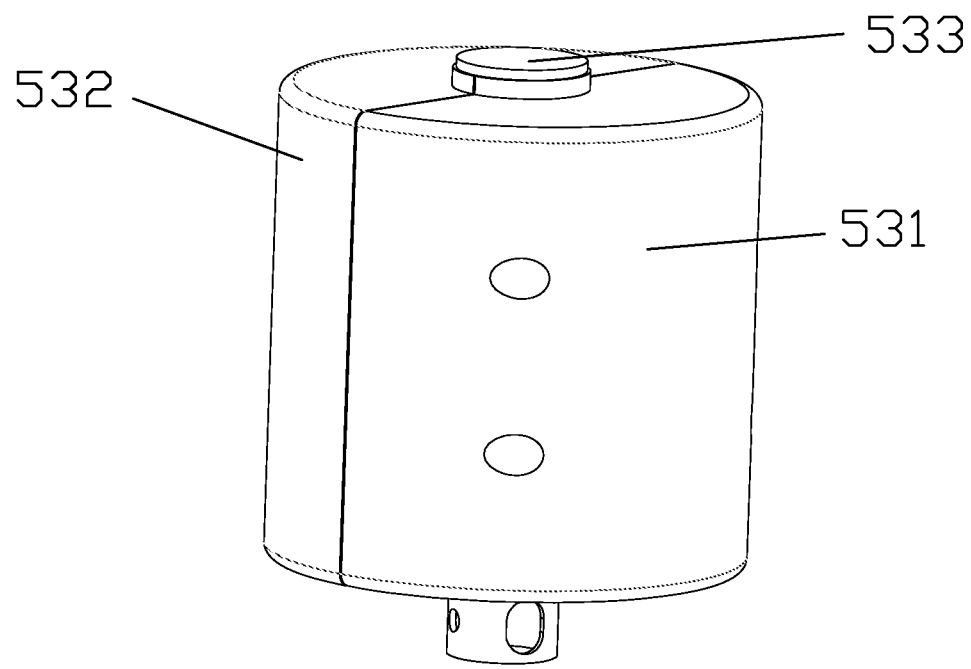
FIG. 4 is an external structural diagram of an electric eddy current sensor assembly in the present invention.
Figure 5:
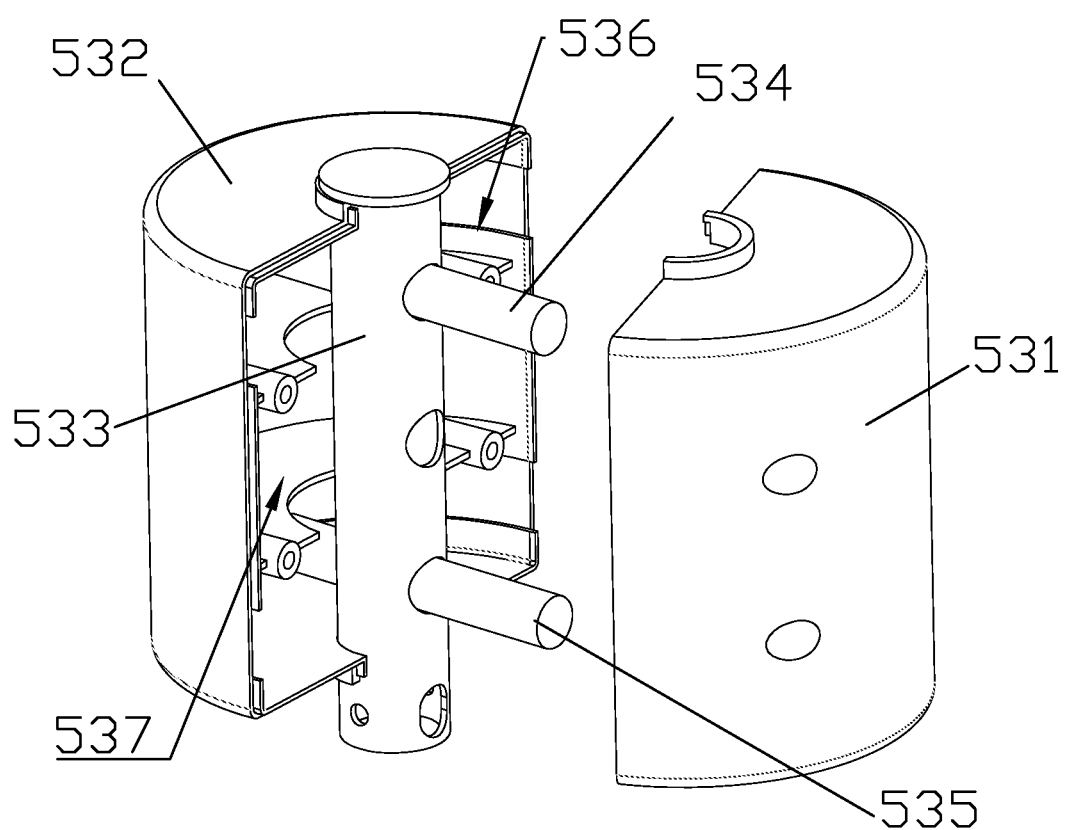
FIG. 5 is an internal structural diagram of the electric eddy current sensor assembly in the present invention.
Figure 6:
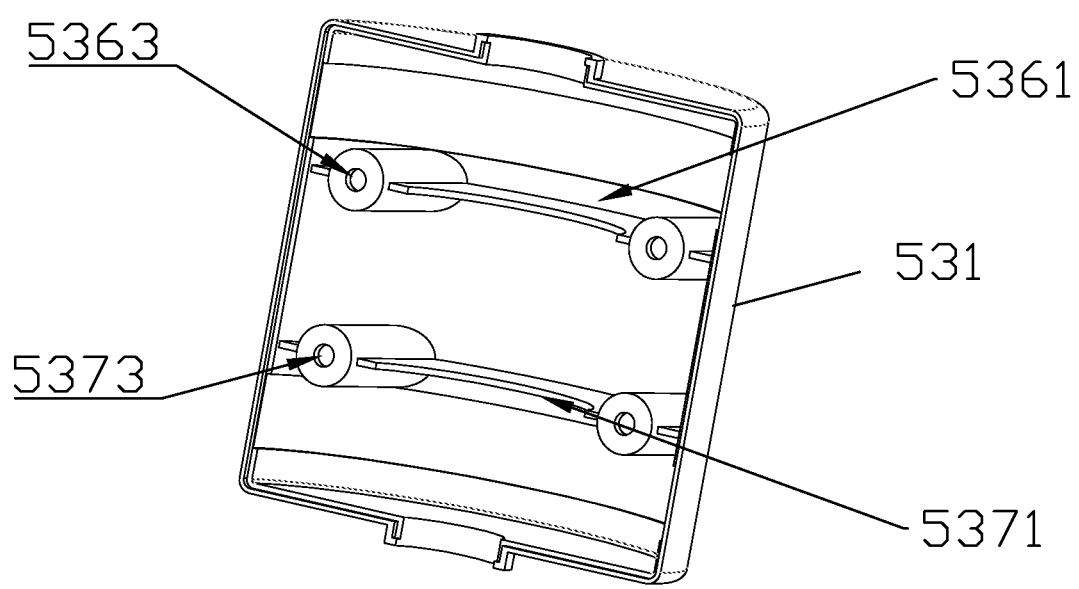
FIG. 6 is a structural diagram of a first electric eddy current cylinder housing in the present invention.
Figure 7:
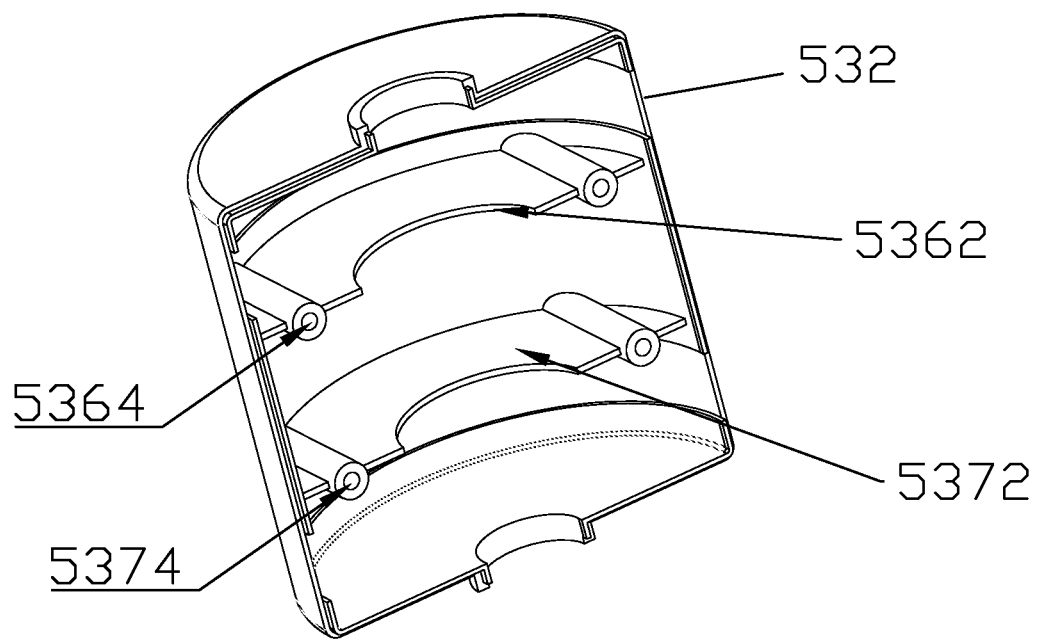
FIG. 7 is a structural diagram of a second electric eddy current cylinder housing in the present invention.
Figure 8:
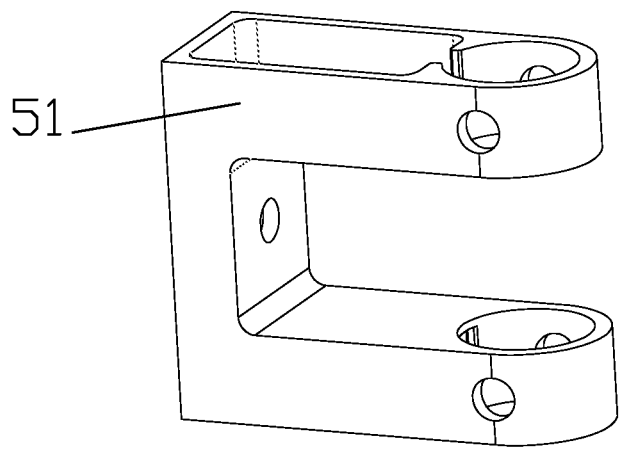
FIG. 8 is a structural diagram of an electric eddy current mounting bracket in the present invention.

In the present embodiment, with reference to FIGS. 1, 2 and 9, the spring buffer mechanism 3 includes a slider assembly 31, an electric eddy current buffer spring 32, an electric eddy current spring guide post 33, an electric eddy current guide rod seat 34 and an electric eddy current spring seat 35, wherein the slider assembly 31 has two sets, the two sets of slider assembly 31 are arranged horizontally, and the electric eddy current spring guide post 33 is disposed between the two sets of slider assembly 31; the electric eddy current guide rod seat 34 and the electric eddy current spring seat 35 are mounted on the electric eddy current spring guide post 33, and the electric eddy current spring seat 35 is seated on the left of the electric eddy current spring guide post 33; the electric eddy current guide rod seat 34 is seated on the right of the electric eddy current spring guide post 33, and the electric eddy current spring guide post 33 is sleeved outside with the electric eddy current buffer spring 32; a left portion of the electric eddy current buffer spring 32 is connected to the electric eddy current spring seat 35, a right portion of the electric eddy current buffer spring 32 is connected to electric eddy current guide rod seat 34, and a right end of the electric eddy current spring guide post 33 is connected to a bottom middle of the electric eddy current fixing base 1. The spring buffer mechanism 3 is disposed below the electric eddy current base plate 2. With provision of the electric eddy current buffer spring 32, the electric eddy current spring guide post 33, the electric eddy current guide rod seat 34 and the electric eddy current spring seat 35, the position of the electric eddy current mechanism 5 is finely adjusted in the horizontal direction so that the electric eddy current sensor assembly may not be in hard contact with the electrical components, thereby reducing damage to the electrical components and the electric eddy current sensors.

In the present embodiment, with reference to FIG. 9, the slider assembly 31 includes a slide rail 311 and a slider 312, wherein a slide groove is disposed on the slide rail 311, the slider 312 is disposed in the slide groove, and the slider 312 is connected to the electric eddy current base plate 2. With provision of the slide rail 311 and the slider 312, the electric eddy current base plate 2 slides on the slide rail 311 when the electric eddy current mechanism 5 is in contact with electrical components, so that under the action of the electric eddy current buffer spring 32, the electric eddy current sensor assembly may not be in hard contact with the electrical components, thereby reducing damage to the electrical components and the eddy current sensors.

In the present embodiment, with reference to FIGS. 1 and 2, a spring buffer sensing photoelectric switch 36 is disposed on the electric eddy current spring seat 35, and a spring buffer sensing block 37 matching with the spring buffer sensing photoelectric switch 36 is disposed on the slider assembly 31. With provision of the spring buffer sensing photoelectric switch 36, the extension or compression of the electric eddy current buffer spring 32 will not exceed a set range.

The working principle of the present invention: when an inspection robot is required to detect electrical components in the power station, first by feeding the adjustment structure of the electric eddy current sensor to the side of the electrical components by the inspection robot, and then by rotating the rotation adjustment structure 4, the control system (not shown) on the inspection robot drives the adjustment motor 41 to start working, thereby driving the reducer 42 to start working, and the reducer 42 may be a gear reducer, a worm reducer 42 or a planetary reducer 42, so that the output torque of the active adjustment shaft 43 is increased through the action of the reducer 42. Then, with the engaging action between the active adjustment gear 45 and the driven adjustment gear 46, the driven adjustment gear 46 drives the active adjustment shaft 44 to rotate, thereby driving the electric eddy current turntable 47 to rotate. In this way, the first electric eddy current sensor assembly 53, the second electric eddy current sensor assembly 54, the third electric eddy current sensor assembly 55 and the fourth electric eddy current sensor assembly 56 on the electric eddy current mechanism 5 may be adjusted for rotation adjustment, so that the four electric eddy current sensor assemblies are adjusted to the appropriate positions, which is convenient for the inspection robot to perform detection for electric eddy current on the electrical assemblies in the power station and complete the related detection work. During use, in order to prevent the electric eddy current sensor assembly from being in hard contact with the electrical components, the spring buffer mechanism 3 is disposed below the electric eddy current fixing base 1, and then with provision of the electric eddy current buffer spring 32, the electric eddy current spring guide post 33, the electric eddy current guide rod seat 34 and the electric eddy current spring seat 35, the position of the electric eddy current mechanism 5 is finely adjusted in the horizontal direction so that the electric eddy current sensor assembly may not be in hard contact with the electrical components, thereby reducing damage to the electrical components and the electric eddy current sensors.

The above are only specific embodiments of the present invention, but the technical features of the present invention are not limited thereto. Any simple changes, equivalent replacements, or modifications made based on the present invention to solve basically the same technical problems and achieve substantially the same technical effects are covered by the scope of the present invention.

What is claimed is:

1. An adjustment structure for an electric eddy current sensor, comprising:
    an electric eddy current fixing base;
    an electric eddy current base plate;
    a spring buffer mechanism;
    a rotation adjustment mechanism; and
    an electric eddy current mechanism;
    wherein the rotation adjustment mechanism is disposed on the electric eddy current fixing base, the electric eddy current mechanism is disposed on the rotation adjustment mechanism, the electric eddy current base plate is disposed on a bottom of the electric eddy current fixing base, and the spring buffer mechanism is disposed on a bottom of the electric eddy current base plate;
    wherein the spring buffer mechanism comprises a slider assembly, an electric eddy current buffer spring, an electric eddy current spring guide post, an electric eddy current guide rod seat and an electric eddy current spring seat wherein the slider assembly has two sets, the two sets of slider assembly are arranged horizontally, and the electric eddy current spring guide post is disposed between the two sets of slider assembly; the electric eddy current guide rod seat and the electric eddy current spring seat are mounted on the electric eddy current spring guide post, and the electric eddy current spring seat is seated on a left side of the electric eddy current spring guide post the electric eddy current guide rod seat is seated on a right side of the electric eddy current spring guide post, and the electric eddy current spring guide post is sleeved outside with the electric eddy current buffer spring; a left portion of the electric eddy current buffer spring is connected to the electric eddy current spring seat, a right portion of the electric eddy current buffer spring is connected to electric eddy current guide rod seat, and a right end of the electric eddy current spring guide post is connected to a bottom middle of the electric eddy current fixing base.

2. The adjustment structure for an electric eddy current sensor according to claim 1, wherein the rotation adjustment mechanism comprises an adjustment motor, a reducer, an active adjustment shaft, a driven adjustment shaft, an active adjustment gear, a driven adjustment gear, and an electric eddy current turntable; wherein the reducer is fixedly mounted in an inner middle of the electric eddy current fixing seat, an input terminal of the reducer is connected with the adjustment motor, and an output terminal of the reducer is connected with the active adjustment shaft; the active adjustment gear is disposed on an end of the active adjustment shaft, and the active adjustment gear is engagedly connected with the driven adjustment gear; the driven adjustment gear is sleeved in a middle of the driven adjustment shaft, a left end of the driven adjustment shaft is pivotally connected to an upper portion of the electric eddy current fixing base, and the electric eddy current turntable is disposed on a right end of the driven adjustment shaft.

3. The adjustment structure for an electric eddy current sensor according to claim 2, wherein the electric eddy current mechanism comprises an electric eddy current mounting bracket and an electric eddy current sensor assembly; the electric eddy current mounting bracket comprises a first electric eddy current mounting bracket and a second electric eddy current mounting bracket, the first electric eddy current mounting bracket having the same structure as the second electric eddy current mounting bracket; the electric eddy current sensor assembly comprises a first electric eddy current sensor assembly, a second electric eddy current sensor assembly, a third electric eddy current sensor assembly and a fourth electric eddy current sensor assembly, the first electric eddy current sensor assembly, the second electric eddy current sensor assembly, the third electric eddy current sensor assembly and the fourth electric eddy current sensor assembly having the same structure; the first electric eddy current mounting bracket is fixedly mounted on a left middle of the electric eddy current turntable, an upper portion of the first electric eddy current mounting bracket is connected with the first electric eddy current sensor assembly, and a lower portion of the first electric eddy current mounting bracket is connected with the second electric eddy current sensor assembly; the second electric eddy current mounting bracket is fixedly mounted on the right middle of the electric eddy current turntable, an upper portion of the second electric eddy current mounting bracket is connected with the third electric eddy current sensor assembly, and a lower portion of the second electric eddy current mounting bracket is connected with the fourth electric eddy current sensor assembly.

4. The adjustment structure for an electric eddy current sensor according to claim 3, wherein the electric eddy current sensor assembly comprises a first electric eddy current cylinder housing, a second electric eddy current cylinder housing, an electric eddy current fixed shaft, an upper electric eddy current sensor and a lower electric eddy current sensor; wherein the first electric eddy current cylinder housing matches the second electric eddy current cylinder housing, and the first electric eddy current cylinder housing matches the second electric eddy current cylinder housing to form an electric eddy current cylinder; the electric eddy current cylinder is a hollow structure, and a middle of the electric eddy current cylinder is penetrated with the electric eddy current fixed shaft; the upper electric eddy current sensor is disposed on an upper part of the electric eddy current fixed shaft, and the lower electric eddy current sensor is disposed on a lower part of the electric eddy current fixed shaft.

5. The adjustment structure for an electric eddy current sensor according to claim 4, wherein an upper fixed panel and a lower fixed panel are disposed in the electric eddy current cylinder, wherein the upper fixed panel comprises a first upper fixed panel and a second upper fixed panel, and the lower fixed panel comprises a first lower fixed panel and a second lower fixed panel; a first upper fixed pin hole is disposed on the first upper fixed panel, and a second upper fixed pin hole is disposed on the second upper fixed panel; first fixed pins are disposed in the first upper fixed pin hole and the second upper fixed pin hole; a first lower fixed pin hole is disposed on the first lower fixed panel, and a second lower fixed pin hole is disposed on the second lower fixed panel; second fixed pins are disposed in the first lower fixed pin hole and the second lower fixed pin hole.

6. The adjustment structure for an electric eddy current sensor according to claim 2, wherein a camera device is disposed in a middle of the electric eddy turntable, and the camera device is fixed at a right end of the driven adjustment shaft.

7. The adjustment structure for an electric eddy current sensor according to claim 2, wherein an electric eddy current position sensing photoelectric switch is disposed on a lower right end of the electric eddy current fixing base, and an electric eddy current position sensing block matching with the electric eddy current position sensing photoelectric switch is disposed on a rear end of the electric eddy current turntable.

8. The adjustment structure for an electric eddy current sensor according to claim 1, wherein the slider assembly comprises a slide rail and a slider, wherein a slide groove is disposed on the slide rail, the slider is disposed in the slide groove, and the slider is connected to the electric eddy current base plate.

9. The adjustment structure for an electric eddy current sensor according to claim 1, wherein a spring buffer sensing photoelectric switch is disposed on the electric eddy current spring seat, and a spring buffer sensing block matching with the spring buffer sensing photoelectric switch is disposed on the slider assembly.

* * * * *